US012682701B2

(12) United States Patent
Jeoung et al.

(10) Patent No.: US 12,682,701 B2
(45) Date of Patent: Jul. 14, 2026

(54) METHOD AND APPARATUS FOR DIAGNOSING AUTOMOBILE TRANSMISSION

(71) Applicants: Hyundai Motor Company, Seoul (KR); Kia Corporation, Seoul (KR)

(72) Inventors: Dongwon Jeoung, Suwon-Si (KR); Geontae Lee, Hwaseong-Si (KR); SeulChan Park, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 201 days.

(21) Appl. No.: 18/532,458

(22) Filed: Dec. 7, 2023

(65) Prior Publication Data

US 2025/0046130 A1     Feb. 6, 2025

(30) Foreign Application Priority Data

Jul. 31, 2023    (KR) ........................ 10-2023-0099818

(51) Int. Cl.
*G07C 5/08*        (2006.01)
*G06N 3/09*        (2023.01)

(52) U.S. Cl.
CPC ............. *G07C 5/0808* (2013.01); *G06N 3/09* (2023.01)

(58) Field of Classification Search
CPC ........ G07C 5/0808; G06N 3/09; G06N 20/00; G06F 18/214; G06F 18/213; G06F 18/24; F16H 61/12; F16H 61/24; F16H 2061/0087; F16H 2061/1256; F16H 2061/126; B60W 50/0205; B60W 2050/021; B60W 2510/10; B60Y 2306/15
See application file for complete search history.

(56) References Cited

U.S. PATENT DOCUMENTS

2024/0092340 A1*   3/2024   Hofstetter .............. B60W 20/11

OTHER PUBLICATIONS

Benchmark for filter methods for feature selection in high-dimensional classification data (Year: 2020).*

* cited by examiner

*Primary Examiner* — Michael V Kerrigan
(74) *Attorney, Agent, or Firm* — Banner & Witcoff, Ltd.

(57) ABSTRACT
A method for diagnosing a transmission based on artificial intelligence may include collecting vehicle information including shift data of a vehicle, pre-processing and labeling the transmission shift data, generating a candidate feature set list including a plurality of candidate feature sets satisfying a specific criterion among feature sets stored in a database, determining, using a supervised learning-based artificial intelligence and for each of the plurality of candidate feature sets, an evaluation index of a transmission shift comfort level associated with the transmission shift data, and determining a feature set of the vehicle by selecting, among candidate feature sets having evaluation indexes above a threshold value, a candidate feature set having a highest evaluation index.

20 Claims, 7 Drawing Sheets

FIG. 5

| Transmission failure diagnosis confusion matrix | | Prediction | | | | | |
|---|---|---|---|---|---|---|---|
| | | OK | NG1 | NG2 | NG3 | NG4 |
| Actual | OK | TP | FN | FN | FN | FN |
| | NG1 | FP | TN | FN | FN | FN |
| | NG2 | FP | FP | TN | FN | FN |
| | NG3 | FP | FP | FP | TN | FN |
| | NG4 | FP | FP | FP | FP | TN |

FIG. 7

METHOD AND APPARATUS FOR DIAGNOSING AUTOMOBILE TRANSMISSION

CROSS-REFERENCE TO RELATED APPLICATION

This application claims priority to and the benefit of Korean Patent Application No. 10-2023-0099818, filed on Jul. 31, 2023 in the Korean Intellectual Property Office, the entire contents of which is incorporated herein by reference.

BACKGROUND

(a) Field

The present disclosure relates to a method and apparatus for diagnosing a transmission based on artificial intelligence. More particularly, the present disclosure relates to a method and apparatus for diagnosing a transmission based on artificial intelligence capable of optimization by reducing the amount of data required for learning and reflecting customer complaint data.

(b) Description of the Related Art

Automatic transmission shifting feel means feeling of a driver from acceleration fluctuation, engine speed fluctuation, and noise therefrom, or the like generated by engagement/disengagement of shift clutches of an automatic transmission. The driver feels the shifting feel mainly from the acceleration fluctuation, and determines malfunction of the transmission based on the shifting feel, in other words, the driver's emotion. For example, based on the driver's sensitivity, if an impactful shifting occurs or shifting is slow, it is recognized that a transmission failure has occurred. Each manufacturer secures an appropriate shifting feel of automatic transmissions through the shifting feel tuning of affiliated researchers and the evaluation and improvement process of various people. However, due to deviation in hardware (H/W) manufacturing, some mass-produced vehicles may experience a shifting feel degraded than that designed at the time of development, and depending on the driver's emotional standards, the shifting feel at the development level may also be felt to be slow or involve a shock.

When a driver's complaint on automatic shifting feel occurs, there is no way to distinguish whether the problem is merely due to emotional standards or a hardware problem, other than a quantitative evaluation method, and there may be occasions to replace the hardware without any actual hardware problem. To prevent these problems, there is a logic capable of telling whether a component part or an entire transmission is to be replaced, a portable diagnosis equipment (which is referred to as a global diagnosis system (GDS)), by measuring data of an automatic multi-speed transmission of 6 speeds or 8 speeds and determining whether the shifting feel is problematic (NG, not good) or not (OK).

Supervised learning-based artificial intelligence techniques for determining the shifting feel require sufficient quantity and quality of learning data, and accurate labeling. In general, in order to create a feature set, which is a collection of feature values, developers of the shifting feel secure data through testing, pre-process and label them, and then train an artificial intelligence model with them.

This method has limitations, in which, first, it is difficult to share the feature set of a specific vehicle because the level of shifting feel required for each vehicle and vehicle class is different. Second, since the powertrain (PT) combinations (engine displacement and transmission type) for vehicles and vehicle classes are diverse, it takes a lot of time to secure the data necessary to create an artificial intelligence database DB considering each vehicle type and PT combination. Third, in order to maintain a certain standard for the emotional area of data-based judgment, only those responsible for developing the shifting feel must participate in labeling, which is time-consuming. Fourth, if the standards of the person in charge of developing the shifting feel and the standards of the customer are different, there are difficulties in actual use.

The above information disclosed in this Background section is only for enhancement of understanding of the background of the disclosure, and therefore it may contain information that does not form the prior art that is already known in this country to a person of ordinary skill in the art.

SUMMARY

The present disclosure attempts to provide a method and apparatus for diagnosing a transmission based on artificial intelligence capable of generating optimized database by reducing total amount of data and labeling man-hour through determining whether the feature set of a vehicle may be shared.

The present disclosure attempts to provide a method and apparatus for diagnosing a transmission based on artificial intelligence capable of confirming and modifying misdiagnosis of data determined as failure, with respect to customer complaint data collected by repair shop, and updating the feature set.

According to one or more example embodiments of the present disclosure, a method may include: collecting vehicle information comprising transmission shift data of a vehicle; pre-processing and labeling the transmission shift data; generating a candidate feature set list comprising a plurality of candidate feature sets, among feature sets stored in a database, satisfying a specific criterion; determining, using a supervised learning-based artificial intelligence and for each of the plurality of candidate feature sets, an evaluation index of a transmission shift comfort level associated with the transmission shift data; and determining a feature set of the vehicle by selecting, among candidate feature sets having evaluation indexes above a threshold value, a candidate feature set having a highest evaluation index.

The method may further include: based on none of a second plurality of candidate feature sets having an evaluation index above the threshold value, generating a new feature set based on additional transmission shift data associated with the vehicle.

Generating the candidate feature set list may include: determining, as the plurality of candidate feature sets, a plurality of feature sets with respect to a plurality of other vehicles each associated with vehicle information that is same as at least a portion of the vehicle information of the vehicle.

The portion of the vehicle information of the vehicle may include at least one of a transmission model, motor usage, an engine fuel, an engine displacement, or an engine type.

The evaluation index may be based on a confusion matrix-based performance evaluation index indicating, using an accuracy rating and a false positive (FP) rate, performance of the supervised learning-based artificial intelligence.

Determining the feature set of the vehicle may include: selecting, among the candidate feature sets having accuracy ratings above a second threshold value and FP rates below a third threshold value, the candidate feature set based on the candidate feature set having a highest accuracy rating.

The method may further include determining the accuracy rating of the confusion matrix-based performance evaluation index based on a formula, $(TP+TN)/(TP+TN+FN+FP)$, and calculating the FP rate of the confusion matrix-based performance evaluation index based on a formula, $FP/(TP+TN+FN+FP)$. With respect to a transmission shift comfort level associated with the supervised learning-based artificial intelligence: TP may represent true positive indicating that a positive prediction is correct; TN may represent true negative indicating that a negative prediction is correct; FP may represent false positive indicating that a positive prediction is wrong; and FN may represent false negative indicating that a negative prediction is wrong.

Determining the feature set of the vehicle may include: securing data about the vehicle; pre-processing and labeling the secured data; training, based on the pre-processed and labeled data, the supervised learning-based artificial intelligence; and storing, in the database, a feature set generated by the training. Training the supervised learning-based artificial intelligence may include using a semi-supervised learning methodology.

The semi-supervised learning methodology may include a MixMatch algorithm.

According to one or more example embodiments of the present disclosure, a method for diagnosing a transmission based on artificial intelligence may include: measuring first transmission shift data of a vehicle; pre-processing the measured first transmission shift data; determining, using a supervised learning-based artificial intelligence and based on a first feature set associated with the vehicle, a transmission shift comfort level; receiving information on dissatisfaction of a customer regarding the transmission shift comfort level; receiving, based on a determination that the information on the dissatisfaction indicates that the customer has a complaint associated with the determined transmission shift comfort level, customer complaint data comprising the pre-processed first transmission shift data and the determined transmission shift comfort level; labeling misdiagnosed data confirmed by a user, based on an accumulated count of the received customer complaint data being above a first threshold value; generating second transmission shift data by adding the misdiagnosed data to the first feature set; training, based on the second transmission shift data, the supervised learning-based artificial intelligence and generating a second feature set associated with the vehicle; and storing the second feature set based on an evaluation index of the trained supervised learning-based artificial intelligence being above a second threshold value.

Generating the second transmission shift data may include: determining a label ratio of the second transmission shift data; training the supervised learning-based artificial intelligence based on the label ratio satisfying a third threshold value; and terminating the training of the supervised learning-based artificial intelligence based on the label ratio not satisfying the third threshold value.

The evaluation index may be based on a confusion matrix-based performance evaluation index indicating, using an accuracy rating and a false positive (FP) rate, performance of the supervised learning-based artificial intelligence.

Storing the second feature set may include: setting the second feature set of the trained supervised learning-based artificial intelligence as a representative feature set of the vehicle based on the accuracy rating being above a fourth threshold value and the FP rate being below a fifth threshold value.

According to one or more example embodiments of the present disclosure, an apparatus for diagnosing a transmission based on artificial intelligence may include: one or more processors; and memory storing instructions. The instructions, when executed by the one or more processors, may cause the apparatus to: collect and pre-process vehicle information and transmission shift data associated with a vehicle; label the transmission shift data; generate a candidate feature set list comprising a plurality of candidate feature sets, among feature sets stored in a database, satisfying a specific criterion; determining, using a supervised learning-based artificial intelligence and for each of the plurality of candidate feature sets, an evaluation index of a transmission shift comfort level associated with the transmission shift data; and determining a feature set of the vehicle by selecting, among candidate feature sets having evaluation indexes above a threshold value, a candidate feature set having a highest evaluation index.

The instructions, when executed by the one or more processors, may further cause the apparatus to, based on none of a second plurality of candidate feature sets having an evaluation index above the threshold value, generate a new feature set based on additional transmission shift data associated with the vehicle.

The instructions, when executed by the one or more processors, may cause the apparatus to generate the new feature set by using a semi-supervised learning methodology comprising a MixMatch algorithm.

The instructions, when executed by the one or more processors, may cause the apparatus to generate the candidate feature set list by determining, as the plurality of candidate feature sets, a plurality of feature sets with respect to a plurality of other vehicles each associated with vehicle information that is same as at least a portion of the vehicle information of the vehicle.

The evaluation index may be based on a confusion matrix-based performance evaluation index indicating, using an accuracy rating and a false positive (FP) rate, performance of the supervised learning-based artificial intelligence. The instructions, when executed by the one or more processors, may cause the apparatus to determine the feature set of the vehicle by selecting, among the candidate feature sets having accuracy ratings above a second threshold value and FP rates below a third threshold value, the candidate feature set based on the candidate feature set having a highest the accuracy rating.

The instructions, when executed by the one or more processors, may further cause the apparatus to, based on customer complaint data associated with the transmission shift comfort level satisfying a first threshold value: generate second transmission shift data by: labeling misdiagnosed data confirmed by a user; and adding the misdiagnosed data to existing data to generate an updated feature set; and based on an evaluation index associated with the updated feature set satisfying a second threshold value, determining the updated feature set as a final feature set of the vehicle and storing the updated feature set in the database.

The instructions, when executed by the one or more processors, may further cause the apparatus to: use a confusion matrix-based performance evaluation index configured to evaluate performance of the supervised learning-based artificial intelligence according to an accuracy rating and a false positive (FP) rate; and determine the updated feature set as the final feature set of the vehicle, based on the accuracy rating of the confusion matrix-based performance evaluation index being above a third threshold value and the FP rate of the confusion matrix-based performance evaluation index being below a fourth threshold value.

BRIEF DESCRIPTION OF THE DRAWINGS

FIG. 5 is a table showing a confusion matrix used to an evaluation index according to an embodiment.

FIG. 7 is a drawing showing a process diagnosing a vehicle by using a method for diagnosing a transmission based on artificial intelligence according to an embodiment.

DETAILED DESCRIPTION OF THE EMBODIMENTS

Figure 1:
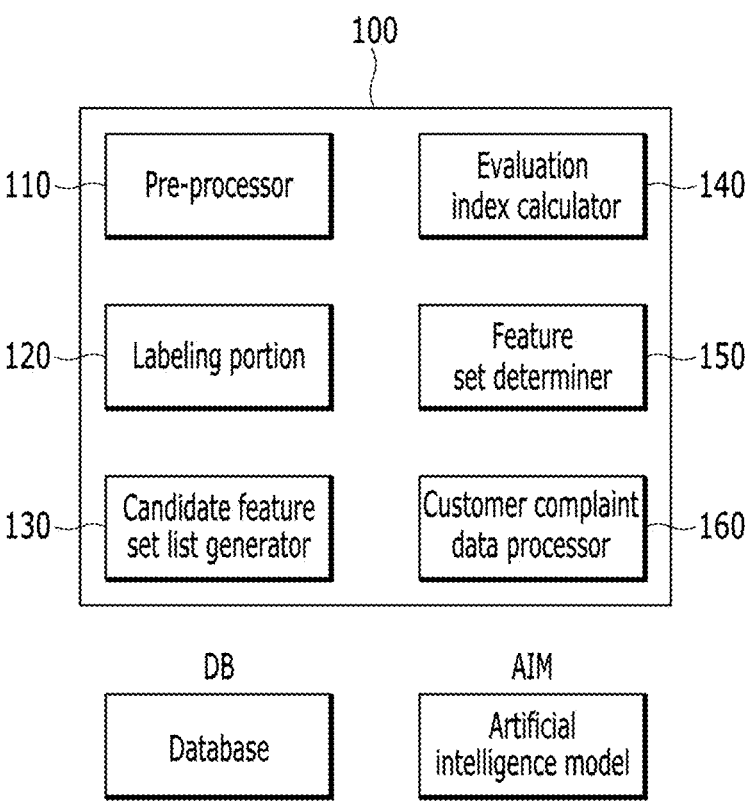
FIG. 1 is a block diagram of an apparatus for diagnosing a transmission based on artificial intelligence according to an embodiment.

An embodiment of the disclosure will be described more fully hereinafter with reference to the accompanying drawings such that a person skill in the art may easily implement the embodiment. As those skilled in the art would realize, the described embodiments may be modified in various different ways, all without departing from the spirit or scope of the present disclosure. In order to clarify the present disclosure, parts that are not related to the description will be omitted, and the same elements or equivalents are referred to with the same reference numerals throughout the specification.

In addition, unless explicitly described to the contrary, the word "comprise" and variations such as "comprises" or "comprising" will be understood to imply the inclusion of stated elements but not the exclusion of any other elements. Terms including an ordinary number, such as first and second, are used for describing various constituent elements, but the constituent elements are not limited by the terms. The terms are only used to differentiate one component from other components.

In addition, the terms "unit", "part" or "portion", "-er", and "module" in the specification refer to a unit that processes at least one function or operation, which may be implemented by hardware, software, or a combination of hardware and software.

Hereinafter, one or more example embodiments of the present disclosure will be described with reference to the drawings.

FIG. 1 is a block diagram of an apparatus for diagnosing a transmission based on artificial intelligence according to an embodiment. Each component shown in FIG. 1 may be implemented with hardware (e.g., one or more processors and memory storing instructions executable by the one or more processors), software, or a combination of both.

A method for diagnosing a transmission (also referred to as a gear transmission, a gear box, etc.) based on artificial intelligence is performed by an apparatus 100 for diagnosing a transmission based on artificial intelligence. The apparatus 100 for diagnosing a transmission based on artificial intelligence may be provided as one server. Alternatively, the apparatus 100 for diagnosing a transmission based on artificial intelligence may be provided through a plurality of servers and/or apparatuses. In this case, the plurality of servers and/or apparatuses may be connected through a network. The apparatus 100 for diagnosing a transmission based on artificial intelligence May be connected to a database DB and an artificial intelligence model AIM through the network. The apparatus 100 for diagnosing a transmission based on artificial intelligence may include the database DB and the artificial intelligence model AIM.

In an embodiment, the apparatus 100 for diagnosing a transmission based on artificial intelligence may be provided as a server, and a diagnosis equipment of a vehicle provided in the form of a user terminal may be connected through the network. The apparatus 100 for diagnosing a transmission based on artificial intelligence may optimize the database DB required for a supervised learning-based artificial intelligence model AIM stored the diagnosis equipment (e.g., tablet computer) of the vehicle. The apparatus 100 for diagnosing a transmission based on artificial intelligence may generate or update a feature set with respect to each vehicle included in the database DB.

Here, the feature set may refer to elements of input data used by the artificial intelligence model when learning or making determination. A feature represents a variable that explains individual observations within a dataset, and a collection of multiple features may be the feature set. In the artificial intelligence, a feature set may be weight values that are learned by receiving data input, may be defined as a collection of data features or items, and a feature set may be referred to as a feature. For example, in one embodiment, the feature set may be various pieces of information including an engine RPM, a transmission state, the vehicle speed, or the like, required to determine the shifting feel. The shifting feel may refer to a level of comfort that a passenger of the vehicle feels when a transmission shift is performed. The shifting feel may be a measure of a subjective comfort level as reported by the passenger.

The feature set may include various features depending on vehicles. The feature set may be different depending on the type of vehicle. For example, the feature set A of the vehicle A having a first vehicle type may be different from the feature set B of the vehicle B having a second vehicle type different from the first vehicle type. However, in an embodiment, if hen the vehicle information of the vehicle A and the vehicle information of the vehicle B are partially the same, the already generated feature set A may be used for the vehicle B, without generating the feature set B.

FIG. 1 shows components of the apparatus 100 for diagnosing a transmission based on artificial intelligence in a block diagram. Generation and optimization through update of the feature set by the artificial intelligence database DB, performed through the apparatus 100 for diagnosing a transmission based on artificial intelligence, will be described in detail with reference to FIG. 2 to FIG. 7.

Referring to FIG. 1, the apparatus 100 for diagnosing a transmission based on artificial intelligence includes a pre-processor 110, a labeling unit 120, a candidate feature set list generator 130, an evaluation index calculator 140, the feature set determiner 150 and a customer complaint data processor 160.

The pre-processor 110 may collect and pre-process the vehicle information and a shift data of the vehicle. The vehicle information may be used in decision for generating a candidate feature set list for the vehicle of the user in the database DB storing the feature set with respect to a plurality of vehicles. The pre-processor 110 may obtain the vehicle information through a controller area network (CAN) communication of the vehicle, or receive information directly input by the developer (e.g., a manufacturer, an administrator, a user, etc.). For example, the vehicle information may include a power source type (ICE, mHEV, HEV, PHEV, EV), a transmission model (6DCT, 7DCT, 4AT, CVT, or the like . . . ), an engine fuel type (gasoline, diesel, LPG, FFV), an engine displacement, engine operation method (MPI, GDI, turbocharger, supercharger, Atkinson cycle, or the like), the vehicle driving method (2WD/4WD), suspension and shock absorber type, or the like.

The pre-processor 110 may collect the shift data required for diagnosis of the vehicle of the user. The shift data may include information on the transmission of the vehicle. For example, the shift data may include the engine RPM (rotation speed), a gear state, the vehicle speed, a transmission temperature, or the like.

The pre-processor 110 may pre-process data as an essential process for utilizing the artificial intelligence model. For example, since, in the case of shift clutch control, control periods are different according to a shift-stage, a clutch type, a shift control time point, the pre-processor 110 may perform temporal normalization matching data to a predetermined time value for utilization of the artificial intelligence model and recognition of impact generation time point.

The labeling unit 120 may label the pre-processed data. The labeling may be the process of assigning a specific tag or classification to data. This may be a necessary process for a model to learn data and make predictions, mainly in a machine learning. For example, the labeling unit 120 may assign a tag or classification of NG (failure) or OK (normal) to each of the pre-processed data.

The candidate feature set list generator 130 may generate the candidate feature set list including a plurality of candidate feature sets satisfying specific criterion among the feature sets stored in the database DB. The specific criterion may be a standard predetermined by the developer.

For example, the candidate feature set list generator 130 may determine a plurality of feature sets with respect to a plurality of other vehicles each including the vehicle information that is the same as at least a portion of the vehicle information of the vehicle as the candidate feature sets of the corresponding vehicle, and include the determined candidate feature sets in the candidate feature set list. Here, the corresponding vehicle may correspond to the vehicle of the user of which the feature set is to be generated.

The candidate feature set list generator 130 may evaluate similarity of data with respect to various combinations of vehicle types and powertrains, for usability determination of the feature set of another vehicle for the shifting feel diagnosis. The candidate feature set list generator 130 may generate the candidate feature set list on the following specific criterion.

The candidate feature set list generator 130 may determine the feature set of the vehicle showing similar torque generation form for each an accelerator pedal position sensor (APS) as the candidate feature set. For example, the vehicle having similar torque form generated according to a motor usage (ICE, mHEV, HEV, PHEV, or the like), the engine fuel type (gasoline, diesel, LPG, FFV, or the like), engine displacement, engine type (MPI, GDI, turbocharger, supercharger, Atkinson, or the like) ham have high possibility of data sharing.

The candidate feature set list generator 130 may determine the feature set of the vehicle having the same transmission type as the candidate feature set. For example, acceleration waveform generated while shifting is different by gear ratio, or the like according to the transmission type (DCT, AT, CVT, or the like), the possibility of data sharing may be high when the transmission type of the vehicle is the same.

The effect of the vehicle type such as suspension type, shock absorber type, or the like is not large. However, since the expectation level of the customer may be different depending on the vehicle type, the candidate feature set list generator 130 may adjust determination level of the candidate feature set by reflecting the customer complaint data.

The evaluation index calculator 140 may diagnose the shifting feel with respect to the shift data and calculate an evaluation index by using the supervised learning-based artificial intelligence AIM based on the plurality of candidate feature sets.

The evaluation index calculator 140 determines the shifting feel through the supervised learning-based artificial intelligence by using the candidate feature set list and evaluates the evaluation index through this. In this process, the supervised learning-based artificial intelligence AIM receives the candidate feature sets of the candidate feature set list as input values, and perform the shifting feel determination based on the shift data of the vehicle, and its result may be stored to calculate the evaluation index.

A performance evaluation index based on a confusion matrix may be as the evaluation index. The performance evaluation index based on the confusion matrix may evaluate performance of the artificial intelligence according to an accuracy and a wrong detection rate (i.e., false positive (FP) rate). Accuracy may indicate how accurately the artificial intelligence predicts actual phenomena. The FP rate may indicate how incorrectly the artificial intelligence predicts actual phenomena.

The feature set determiner 150 may select the candidate feature set of highest level from among the candidate feature sets having the calculated evaluation index of a specific level or more, and determine as the feature set of the vehicle of the user and store the determined feature set of the vehicle in database. The evaluation index may have a higher level as the accuracy is higher and the FP rate is lower. The specific level may be preset with the accuracy and the FP rate.

For example, the feature set determiner 150 may select a candidate feature set having a highest accuracy from among the candidate feature sets having the accuracy of a preset level or more and the FP rate of the preset level or less, as the feature set of the vehicle. Here, the reason for only checking the accuracy is that misdiagnosis is highly likely to occur depending on the level of shock, and the FP rate may easily fluctuate when vehicle data from the customers having the complaint is reflected. Accordingly, the accuracy resistant to external interference and capable of intuitively confirming performance may be checked. The preset level may be a level predetermined by the developer.

When there is not the candidate feature set having the accuracy of the preset level or more and the FP rate of the preset level or less, the feature set determiner 150 may generate a new feature set after collecting and labeling an additional shift data with respect to the vehicle, and determine as the feature set of the vehicle. For example, the feature set determiner 150 may generate the new feature set by using a semi-supervised learning methodology including a MixMatch algorithm.

The customer complaint data processor 160 diagnoses the shifting feel of the vehicle by using the supervised learning-based artificial intelligence based on the predetermined feature set of the vehicle.

When the customer complaint data on the result is received by a specific count or more, the customer complaint data processor 160 confirms whether there is misdiagnosis through the developer. For example, the customer complaint data processor 160 may send the customer complaint data to the developer, and may receive a misdiagnosis data of which the misdiagnosis is confirmed. The customer complaint data processor 160 re-performs the labeling of the confirmed misdiagnosis data, and adds the labeled data in the existing data to generate a new second shift data. The specific count may be a predetermined number.

The customer complaint data processor 160 may re-learn the supervised learning-based artificial intelligence based on the generated second shift data, generate a newly updated feature set, and when the evaluation index calculated with respect to the updated feature set is the certain level or more, determine the updated feature set as a final feature set of the vehicle. The updated feature set is generated by reflecting the customer complaint issues to the conventional feature set.

The customer complaint data processor 160 uses the confusion matrix-based performance evaluation index that evaluates performance of the artificial intelligence according to the accuracy and the FP rate, and if the accuracy is the preset level or more and the FP rate is a preset level or less, may determine as the final feature set of the vehicle the updated feature set. The customer complaint data processor 160 may update the final feature set of the vehicle in the database DB.

Figure 2:
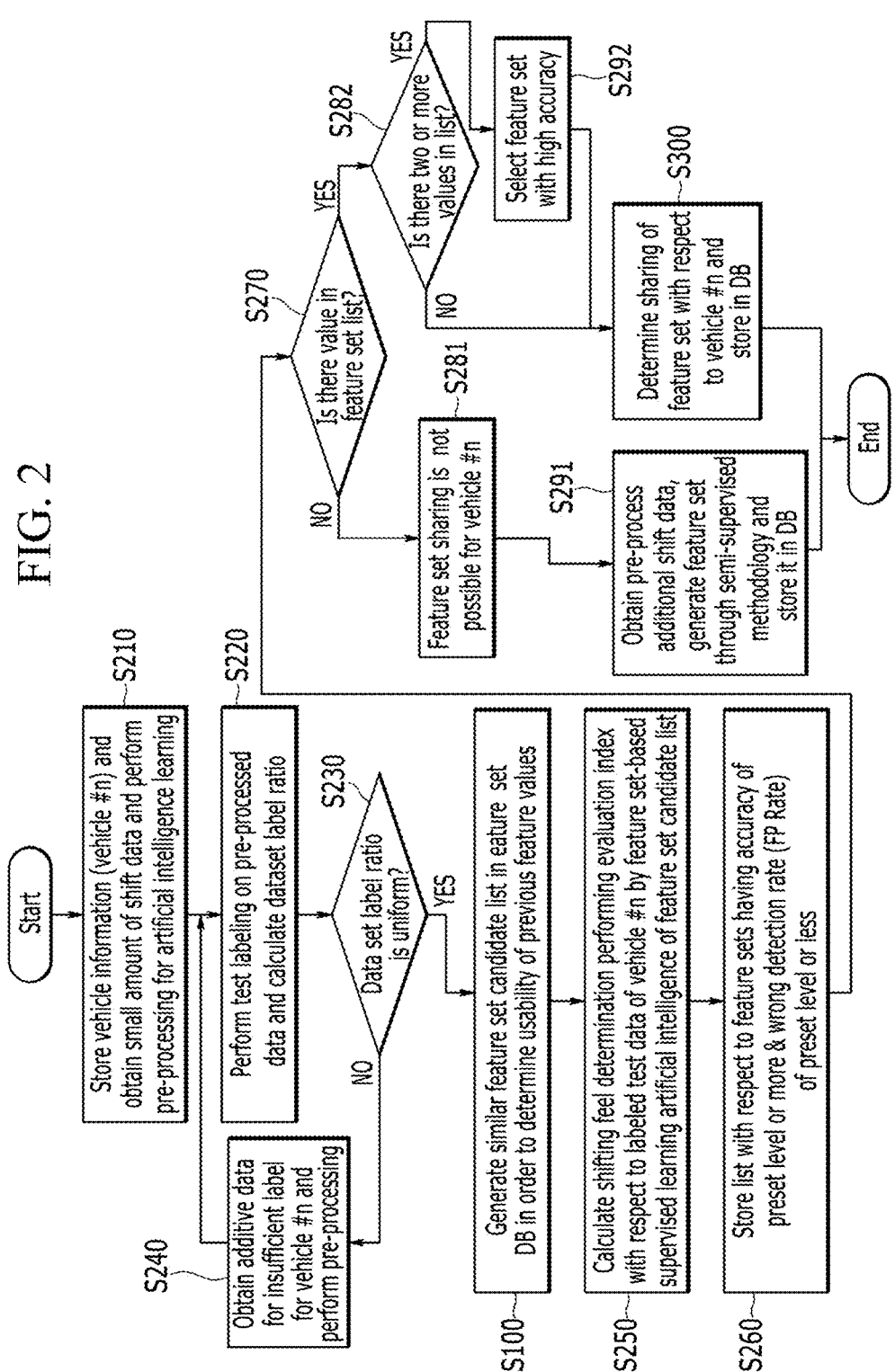
FIG. 2 is a flowchart of a method for diagnosing a transmission based on artificial intelligence according to an embodiment.
Figure 3:
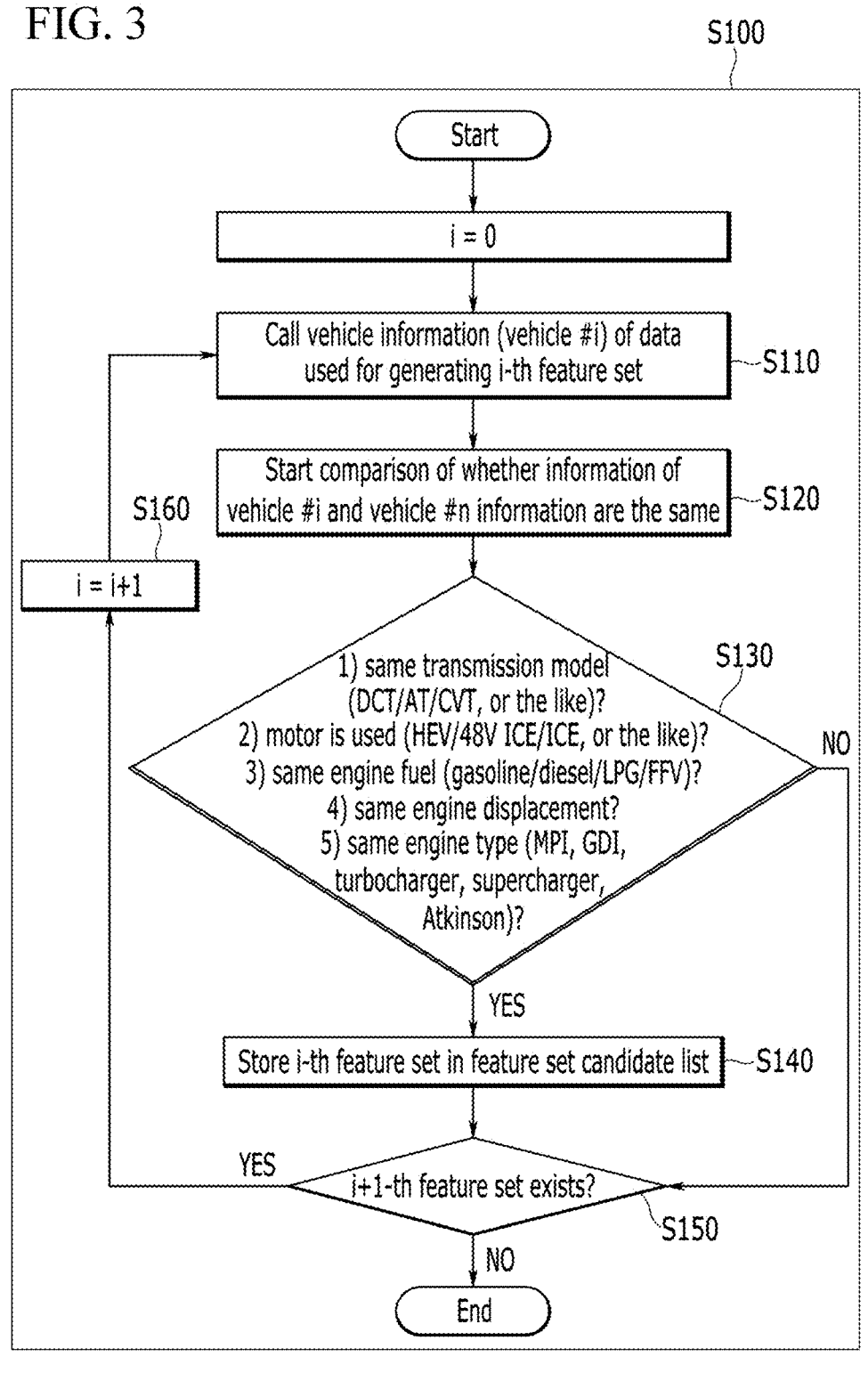
FIG. 3 is a flowchart showing a method of generating the candidate feature set list of FIG. 2.

FIG. 2 is a flowchart of a method for diagnosing a transmission based on artificial intelligence according to an embodiment. FIG. 3 is a flowchart showing a method of generating the candidate feature set list of FIG. 2.

FIG. 2 and in FIG. 3, a method for diagnosing a transmission based on artificial intelligence may be performed through the apparatus 100 for diagnosing a transmission based on artificial intelligence, the database DB and the artificial intelligence model AIM. A method for diagnosing a transmission based on artificial intelligence may be a method for utilizing the feature sets of other vehicles that already exists in the database, in generating the feature set required for diagnosing the transmission of the vehicle by using the artificial intelligence. This will be described below with reference to FIG. 2.

At step S210, in a method for diagnosing a transmission based on artificial intelligence, an apparatus for diagnosing a transmission based on artificial intelligence according to an embodiment 100 may obtain and pre-process the vehicle information and the shift data of the vehicle secure. For example, the apparatus 100 for diagnosing a transmission based on artificial intelligence may obtain and pre-process the vehicle information and the shift data with respect to the n-th vehicle (vehicle #n) to generate the feature set.

At step S220, the apparatus 100 for diagnosing a transmission based on artificial intelligence may perform the labeling on the pre-processed data and calculate a label ratio.

At step S230, the apparatus 100 for diagnosing a transmission based on artificial intelligence may determine whether the label ratio of data is uniform. In an embodiment, the apparatus 100 for diagnosing a transmission based on artificial intelligence may check the label ratio of data in order to secure reliability of the evaluation index. For example, when there are more OK (normal) labels in data rather than in NG1, NG2, NG3, and NG4 labels, OK, the likelihood of overfitting for OK may increase. Accordingly, the prediction accuracy with respect to data of the OK label may be high, but the prediction accuracy with respect to the label NG may be low.

Therefore, at step S240, when the label ratio becomes out of the preset level, the apparatus 100 for diagnosing a transmission based on artificial intelligence may perform pre-processing and labeling work so as to maintain the uniform ratio by adding data to insufficient label, or by removing data from excessive label.

At step S100, when the label ratio is determined to be uniform, the apparatus 100 for diagnosing a transmission based on artificial intelligence may extract the candidate feature sets from the database DB and generate the candidate feature set list, in order to determine usability (sharing) of the feature set (or feature value) of the database DB. In an embodiment, the candidate feature set list may include the plurality of candidate feature sets satisfying the specific criterion among the feature sets of the database DB. For example, the candidate feature sets may include the feature sets with respect to the vehicles including vehicle information similar to that of the n-th vehicle. The step S100 will be described in detail with reference to FIG. 3.

In FIG. 3, the apparatus 100 for diagnosing a transmission based on artificial intelligence may determine the plurality of feature sets with respect to the plurality of other vehicles as the candidate feature sets each including the vehicle information that is the same as at least a portion of the vehicle information of the vehicle. Here, at least a portion of the vehicle information may include the transmission model, the motor usage, the engine fuel, the engine displacement and the engine type.

In an embodiment, at step S110, the apparatus 100 for diagnosing a transmission based on artificial intelligence may call the vehicle information of data used for generating an i-th feature set, that is, may call the vehicle information of an i-th vehicle having the i-th feature set.

At step S120, the apparatus 100 for diagnosing a transmission based on artificial intelligence may compare the vehicle information of the i-th vehicle and the vehicle information of the n-th vehicle of the user to generate the feature set.

At step S130, the apparatus 100 for diagnosing a transmission based on artificial intelligence may check whether the i-th vehicle and the n-th vehicle use the same transmission model, use a motor, use the same engine fuel, has the same engine displacement, and has the same engine type.

At step S140, when whether the i-th vehicle and the n-th vehicle use the same transmission model, use a motor, use the same engine fuel, has the same engine displacement, and has the same engine type, the i-th feature set of the i-th vehicle may be stored in the candidate feature set list of the n-th vehicle. That is, when the listed vehicle information of the i-th vehicle and the n-th vehicle are all the same, it may be considered that the specific criterion to be the candidate feature set is satisfied.

At step S150, after storing the i-th feature set in the feature set list of the n-th vehicle, whether an i+1-th feature set exists in the database may be checked. If it exists, at step S160, the vehicle information of the i+1-th vehicle corresponding to the i+1-th feature set (i+1 feature set) is called and compared with the vehicle information of the n-th vehicle, and when the specific criterion is satisfied, the i+1 feature set is stored in the candidate feature set list. The apparatus 100 for diagnosing a transmission based on artificial intelligence may repeat this process to generate the candidate feature set list of the n-th vehicle.

If any one of the listed vehicle information of the i-th vehicle and the n-th vehicle, at step S150, checking the vehicle information on the i-th vehicle may be stopped and then immediately, whether the i+1-th feature set exists may be checked.

Referring back to FIG. 2, at step S250, the apparatus 100 for diagnosing a transmission based on artificial intelligence may diagnose the shifting feel with respect to the shift data of the n-th vehicle and calculate the evaluation index by using the supervised learning-based artificial intelligence based on the plurality of candidate feature sets. The evaluation index may use the confusion matrix-based performance evaluation index that evaluates performance of the artificial intelligence according to the accuracy and the FP rate.

The apparatus 100 for diagnosing a transmission based on artificial intelligence may extract the candidate feature sets having the calculated evaluation index of the specific level or more and store it in the list. At step S260, the apparatus 100 for diagnosing a transmission based on artificial intelligence may extract the candidate feature sets having the accuracy of the preset level or more from among the candidate feature sets and the FP rate of the preset level or less and store it in the list. For example, the accuracy may be calculated as (TP+TN)/(TP+TN+FN+FP). The FP rate may be calculated as FP/(TP+TN+FN+FP). Here, with respect to the shifting feel of the artificial intelligence, TP (true positive) represents the case (e.g., a number of cases) where a positive prediction is correct, TN (true negative) represents the case (e.g., a number of cases) where a negative prediction is correct, FP (false positive) represents the case (e.g., a number of cases) where a positive prediction is wrong, and FN (false negative) represents the case (e.g., a number of cases) where a negative prediction is wrong. This is explained in detail with reference to FIG. 5.

At step S270, the apparatus 100 for diagnosing a transmission based on artificial intelligence may check through the list whether the candidate feature sets having the evaluation index of the specific level or more are extracted.

If there are not the candidate feature sets stored in the list, at step S281, it may be determined that there is no the feature set that may be shared with respect to the n-th vehicle. At step S291, in this case, the apparatus 100 for diagnosing a transmission based on artificial intelligence may additionally obtain and pre-process the shift data with respect to the n-th vehicle, generate the new feature set by using the semi-supervised learning methodology, and store it in the database. That is, the new feature set is generated as the feature set correspond to the n-th vehicle. For example, the apparatus 100 for diagnosing a transmission based on artificial intelligence may independently obtain data with respect to the n-th vehicle, pre-process and label the obtained data, and generate the new feature set by the artificial intelligence learning through the semi-supervised learning methodology by using pre-processed and labeled data. In an embodiment, the semi-supervised learning methodology may include the MixMatch algorithm. Semi-supervised learning is a field of the machine learning and is a methodology that uses labeled and unlabeled sample data together to learn a model. Semi-supervised learning provides a way to improve performance of the model by utilizing unlabeled data. The MixMatch algorithm is one of the methodologies used in the semi-supervised learning. The mix-match algorithm is a method of learning a model by combining unlabeled and labeled data.

At step S282, if there is the candidate feature set stored in the list, it is checked whether there are a plurality of candidate features. At step S300, when there are a plurality of candidate features, the corresponding candidate feature set may be finally determined as the feature set with respect to the n-th vehicle, and stored in the database DB.

At step S292, if there are a plurality of candidate feature sets stored in the list, the feature set having the highest accuracy may be selected. At step S300, the selected one feature set may be determined to be shared for the feature set of the n-th vehicle, and stored in the database.

Figure 4:
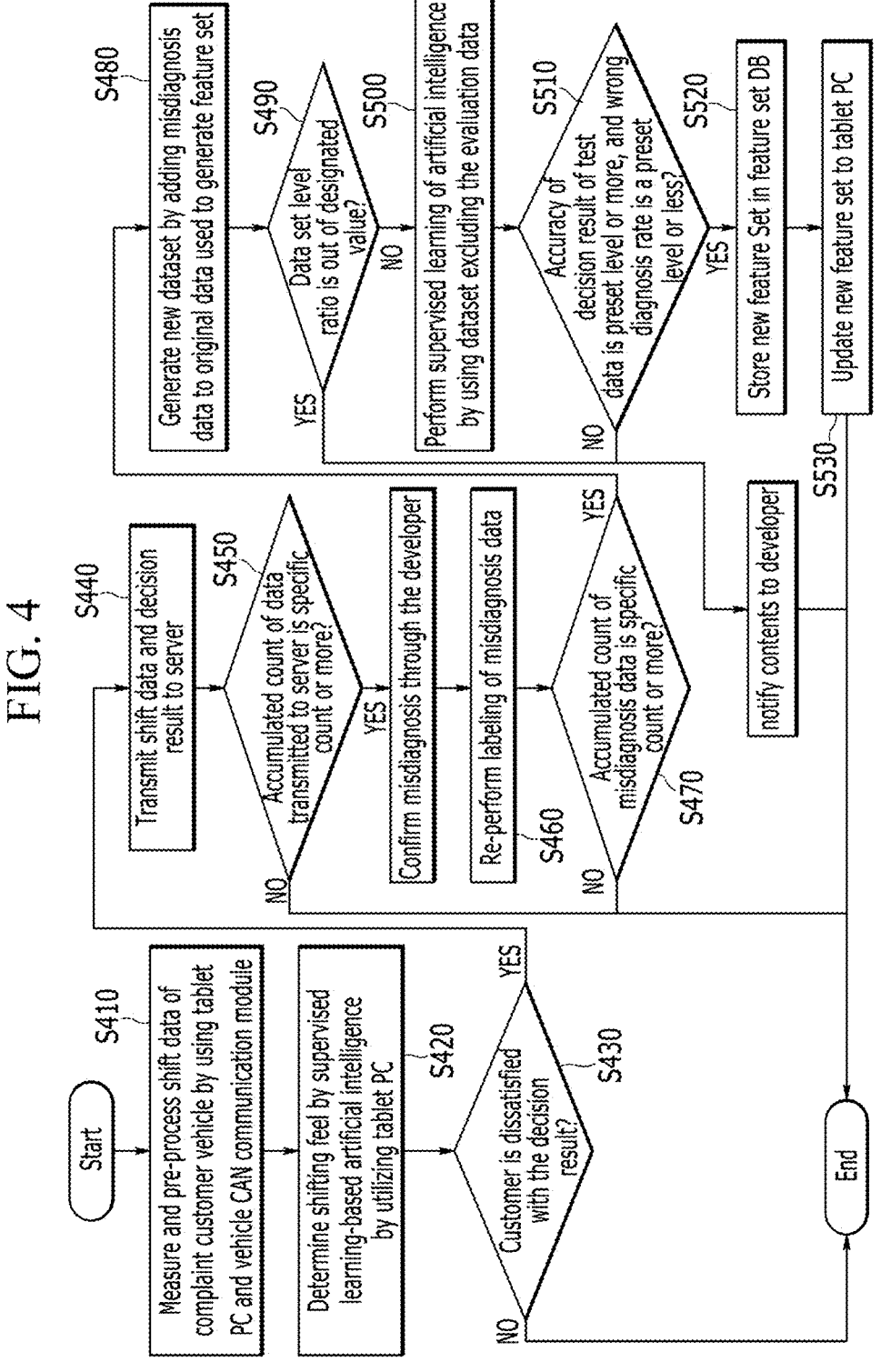
FIG. 4 is a flowchart of a method for diagnosing a transmission based on artificial intelligence according to an embodiment.

FIG. 4 is a flowchart of a method for diagnosing a transmission based on artificial intelligence according to another embodiment. A method for diagnosing a transmission based on artificial intelligence according to an embodiment of FIG. 4 may be a method of updating the feature set of the corresponding vehicle in order to modify the diagnosis result by reflecting the complaint of the customer when diagnosis result of transmission with respect to the specific vehicle of which the feature set is already stored in the database includes a complaint of the customer.

In FIG. 4, at step S410, through the CAN communication of the diagnosis equipment (tablet computer) and the vehicle, the shift data of the vehicle of the complaint customer may be measured, and pre-processing may be performed.

At step S420, the shifting feel of the vehicle may be diagnosed by using the supervised learning-based artificial intelligence model AIM stored in the diagnosis equipment. For example, the shifting feel of the vehicle be diagnosed based on a first feature set with respect to the vehicle of the complaint customer.

At step S430, whether the complaint customer is dissatisfied with the diagnosis result may be determined. For example, whether the complaint customer is dissatisfied with the diagnosis result may be received as information or data on dissatisfaction of the customer, from a repair shop, or the like of the vehicle of the customer. At step S440, when the customer is dissatisfied with the diagnosis result, an apparatus for diagnosing a transmission based on artificial intelligence 100 (refer to FIG. 1) may receive the customer complaint data including the pre-processed shift data of the vehicle and the diagnosis result. The customer complaint data may be received from the repair shop, or the like of the vehicle of the customer, the same as the information on dissatisfaction of the customer.

At step S450, the apparatus 100 for diagnosing a transmission based on artificial intelligence may determine whether an accumulated count of the received customer complaint data is the specific count or more. At step S460, when the accumulated count of the received customer complaint data is the specific count or more, the misdiagnosis may be confirmed through the developer, and labeling with respect to the confirmed misdiagnosis data may be re-perform.

At step S470, the apparatus 100 for diagnosing a transmission based on artificial intelligence may check whether the accumulated count of the misdiagnosis data is above the specific criterion. There is a high probability that the understanding level of the customer for the shifting impact will be higher than the customer level assumed at the time of development. In this case, it is unlike that the artificial intelligence's decision criteria are problematic, so the existing feature set may be used as is until data is accumulated on the server. When the misdiagnosis data is the specific count or more, this means that the actual customer level and developing level are different on the matter of failure diagnosis, or the actual vehicle has a problem occurrence tendency different from problems assumed during development, which require re-learning of the artificial intelligence. Therefore, the specific count may be a preset value within a range that may exclude cases where there are very few complaint customers.

At step S480, when the accumulated count of the misdiagnosis data is the specific count or more, re-learning of the artificial intelligence is required, and accordingly, the apparatus 100 for diagnosing a transmission based on artificial intelligence may generate a dataset including a new shift data by adding the misdiagnosis data to which the labeling is re-performed to the existing original data used for generating the feature set of the vehicle.

The apparatus 100 for diagnosing a transmission based on artificial intelligence calculates the label ratio of a new dataset. That is, at step S490, whether the new dataset label ratio is out of a predetermined value is determined. To this end, the ratio may be obtained by counting the number of data for each label and dividing by the total number of data. If the label ratio is out of the designated value range, re-learning of the artificial intelligence may be stopped and the developer may be notified.

At step S500, when the label ratio is within the designated value range, the evaluation data may be separated and the remaining data may be used to train the supervised learning-based artificial intelligence, For example, when the label ratio of the existing dataset is (1:1:1:1:1), and the designated criterion is set to 2, the following cases may be considered.

Existing (1:1:1:1:1)→(1.5:1.4:1.5 1:1:1.3):Failed. Since the label ratio is out of the designated value range, the artificial intelligence learning is stopped and the developer is notified.

Existing (1:1:1:1:1)→(1.5:1.4:1.5:1:1.3 0.4):Success. Since the label ratio is within the designated value range, the evaluation data is separated from the new dataset and the artificial intelligence is trained with the remaining data. Accordingly, it is possible to prevent the artificial intelligence decision criteria from being distorted when the ratio of data labels is biased. In other words, the label ratio of the dataset for supervised learning is configured to be uniform, to enable accurate judgment.

The apparatus 100 for diagnosing a transmission based on artificial intelligence may determine whether the evaluation index with respect to the new feature set of the vehicle generated by re-learning the supervised learning-based artificial intelligence by dataset including the second shift data is the preset level or more. That is, at step S510, the apparatus 100 for diagnosing a transmission based on artificial intelligence determines, as a result of evaluating the evaluation data, whether the accuracy is the preset level or more and the FP rate is the preset level or less.

If the accuracy or the FP rate does not satisfy the preset level, re-learning of the artificial intelligence may be stopped and the developer may be notified. For example, if the evaluation index with respect to the new dataset having reflected the misdiagnosis data is not good, this may mean that a preset learning variable (i.e., hyperparameter) of the artificial intelligence algorithm do not match the new dataset, or abnormal values are mixed in the new dataset. In this case, it is impossible to solve the problem without the developer's intervention, so the developer is informed of the problem such that an appropriate action may be taken.

At step S520, if the accuracy is the preset level or more and the FP rate is the preset level or less, the learned new feature set of the artificial intelligence is set as the representative feature set of the corresponding vehicle type, and this may be registered in the database DB. Thereafter, at step S530, the new feature set may be updated in the tablet computer of the diagnosis equipment.

FIG. 5 is a table showing the confusion matrix used to the evaluation index according to an embodiment.

In the confusion matrix-based performance evaluation index for transmission failure diagnosis, the accuracy may indicate how accurately the artificial intelligence predicts actual phenomena. For example, the accuracy may be calculated as (TP+TN)/(TP+TN+FN+FP). The FP rate may indicate how wrongly the artificial intelligence predicts actual phenomena. The FP rate is an importance index in failure determination, and if NG (failure) is determined as OK (normal) by misdiagnosis, the customer reliability is deteriorated, possibly leading to fatal failure. The FP rate may be calculated as FP/(TP+TN+FN+FP).

Here, with respect to the shifting feel of the artificial intelligence, TP (true positive) may represent the case (e.g., a number of cases) where a positive prediction (normal) is correct, TN (true negative) may represent the case (e.g., a number of cases) where a negative prediction (failure) is correct, FP (false positive) may represent the case (e.g., a number of cases) where a positive prediction (normal) is wrong, FN (false negative) may represent the case (e.g., a number of cases) where a negative prediction (failure) is wrong.

The label ratio of the labeled data should also be uniform when determining the accuracy and the FP rate. For example, when the ratio of data (OK:NG1:NG2:NG3:NG4) is 4:1:1:1:1 rather than 1:1:1:1:1, OK data has a higher ratio than other NG data, and accordingly, a distortion effect in which the accuracy increases when TP is high may occur. That is, when TP is increased compared to other cases in the equation of "accuracy=(TP+TN)/(TP+TN+FN+FP)", the accuracy converges to 1, and a distortion effect in which the influence of TN is ignored may occur.

Figure 6:
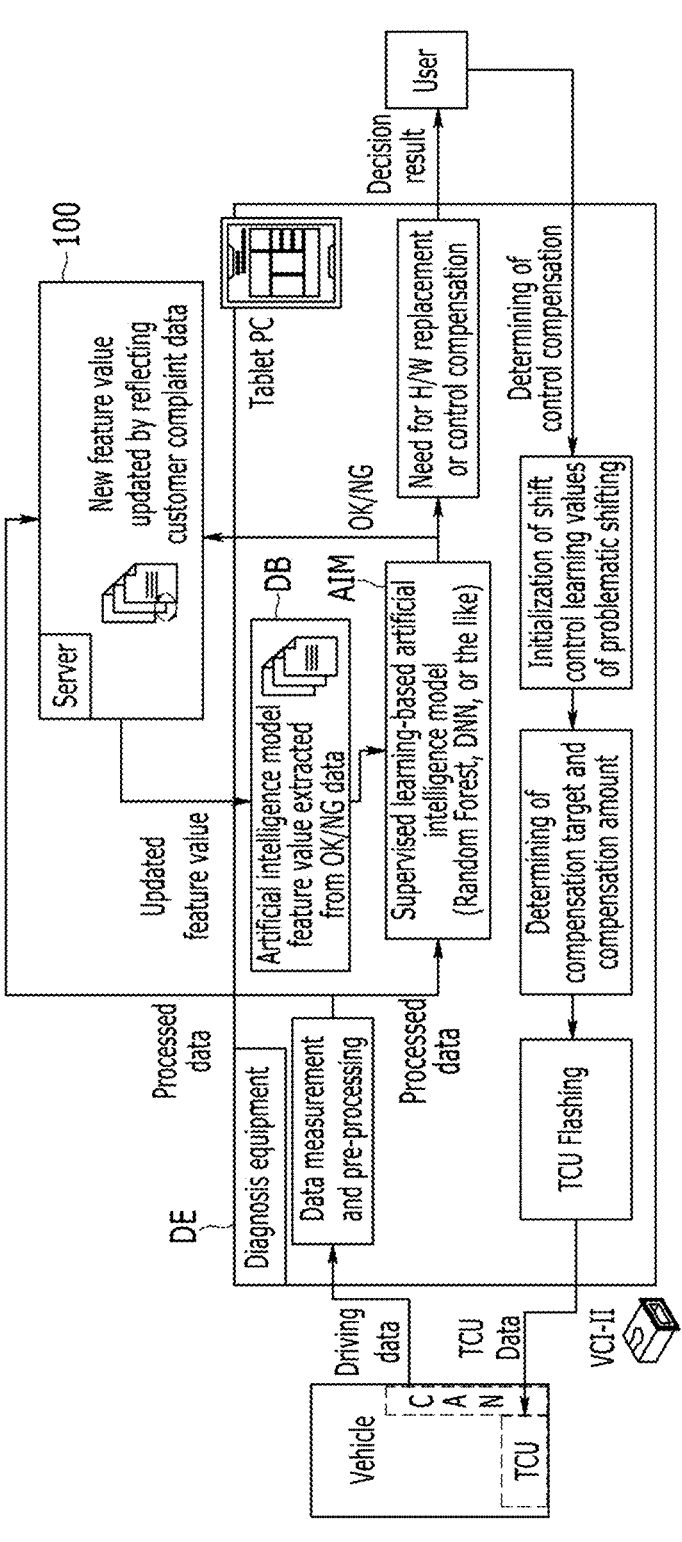
FIG. 6 is a drawing showing a process diagnosing a vehicle by using a method for diagnosing a transmission based on artificial intelligence according to an embodiment.
Figure 7:
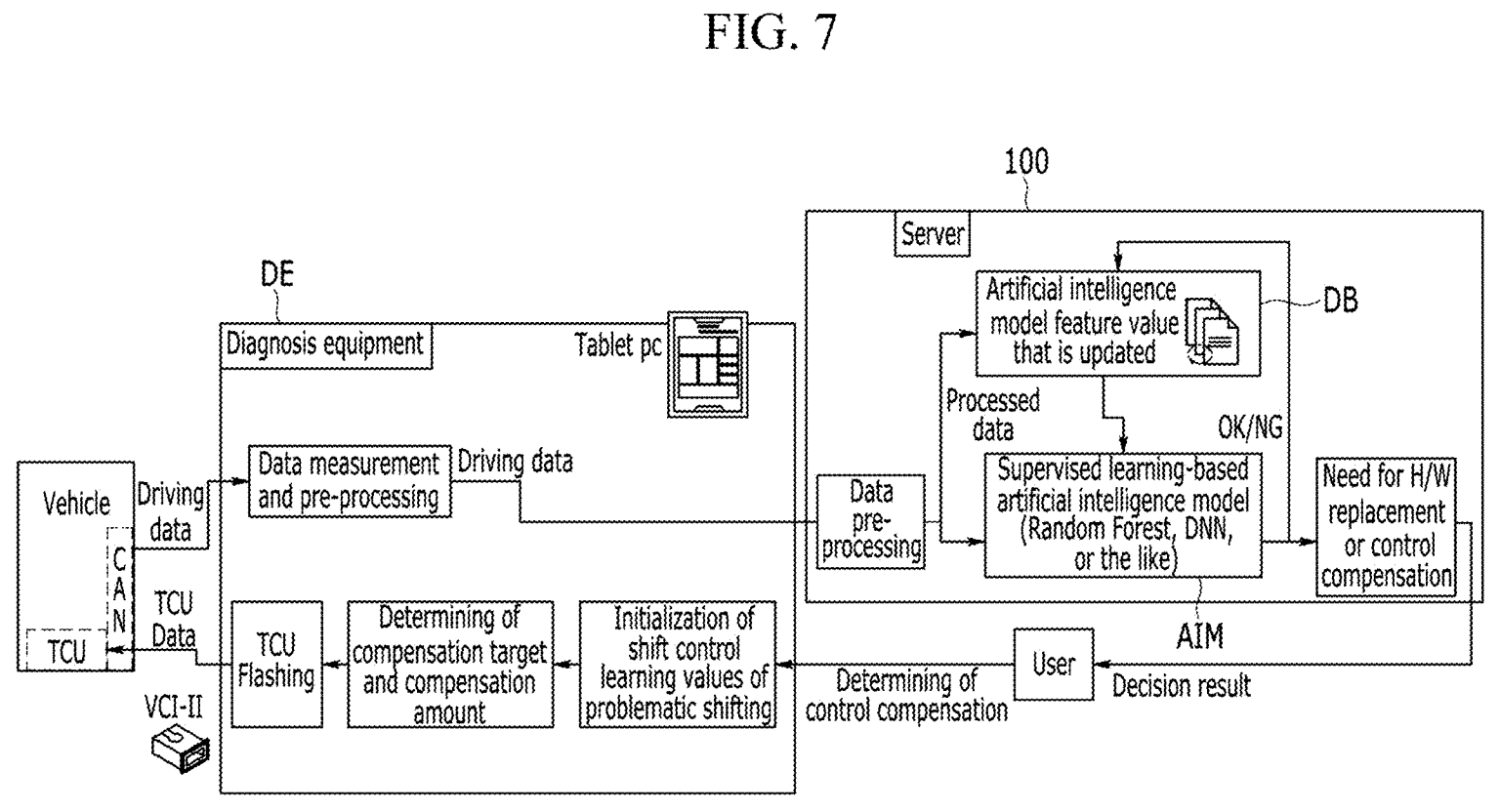

FIG. 6 is a drawing showing a process diagnosing a vehicle by using a method for diagnosing a transmission based on artificial intelligence according to an embodiment. FIG. 7 is a drawing showing a process diagnosing a vehicle by using a method for diagnosing a transmission based on artificial intelligence according to an embodiment.

A method and apparatus for diagnosing a transmission based on artificial intelligence according to an embodiment will be described with reference to FIG. 6 and FIG. 7.

Referring to FIG. 6 and FIG. 7, an apparatus for diagnosing a transmission based on artificial intelligence according to an embodiment may be provided as the server 100. The server 100 may be connected to the diagnosis equipment DE provided as the tablet computer.

The apparatus 100 for diagnosing a transmission based on artificial intelligence may be connected to the database DB and the artificial intelligence model AIM through the network (FIG. 6). The apparatus 100 for diagnosing a transmission based on artificial intelligence may include the database DB and the artificial intelligence model AIM (FIG. 7).

The apparatus 100 for diagnosing a transmission based on artificial intelligence may optimize the artificial intelligence model AIM and the database DB. In an embodiment, the apparatus 100 for diagnosing a transmission based on artificial intelligence may enhance diagnostic performance on transmission failure of the vehicle through the diagnosis equipment DE through optimization of the artificial intelligence model AIM and the database DB.

An embodiment is a method of determining by using the artificial intelligence model that is supervised learned by utilizing sensor values of the vehicle acceleration sensor equally mounted for each vehicle type and the vehicle state signals, instead of determining in a threshold value method by using an acceleration sensor within a diagnosis device.

That is, after training the supervised learning-based artificial intelligence model with the data labeled by the developer at the time of development, repair or evaluation person simultaneously measure the vehicle acceleration sensor value and the vehicle state value signals through the vehicle CAN communication measurement function of the diagnosis device, and whether the case is problem or not is determined and finely classified through calculation capacity of the diagnosis equipment or the server by utilizing the supervised learned artificial intelligence model. Afterwards, when determined as a failure, instead of replacing the transmission or transmission parts, the shift control learning value of the transmission control unit (TCU) is initialized and the solenoid current control amount is adjusted to ensure that the shift control learning performs optimally to improve shock.

For such a purpose, the diagnosis equipment of an embodiment may include a device capable of measuring driving data of the vehicle through CAN communication and performing calculations, learning, and displaying results. And, the diagnosis equipment of an embodiment may be implemented as a diagnostic system that includes a diagnostic server for calculation and learning. The operation sequence by the diagnostic apparatus or diagnostic system is as follows, and additional control compensation methods may be performed depending on the fault diagnosis results.

1) Using diagnosis equipment DE, the driving data during shift control of the transmission that is determined to have a problem are measured at least three times. The driving data may include an engine speed, a torque converter speed, a longitudinal acceleration, an accelerator pedal opening, an engine torque, a transmission output speed, a transmission temperature, an engine temperature, or the like. The driving data is measured from respective sensors mounted on the vehicle and received by the vehicle control apparatus, and the diagnosis equipment receives the driving data through the control apparatus of the vehicle and the CAN communication.

2) the diagnosis equipment DE may receive the driving data, performs calculation (data pre-processing, determining OK/NG of shifting, determine whether problem may be improved by control compensation in the case of NG, determining the amount of control compensation), and depending on cases of, e.g., limited memory size, or the like, after sending the driving data to the apparatus 100 for diagnosing a transmission based on artificial intelligence provided as a separate server (or diagnosis server), receive a result of performing the calculation.

3) the vehicle driving data for utilizing the artificial intelligence model is pre-processed (normalization of a maximum value and a minimum value to a predetermined specific value and down-sampling, with respect to signal value and measurement period)

4) period for each control range and feature values of acceleration signal of the pre-processed data, for determining whether to compensate the control are calculated in advance.

5) the pre-processed data is input to the supervised learning-based artificial intelligence model (e.g., AIM, Random Forest, DNN, or the like), and finely classified into whether it is normal or failure. For example, the final decision is made as a case in which it is determined twice or more for data measured three or more times.

6) when determined as an abnormal case, whether impact may be solved is determined through hardware (H/W) replacement or control compensation through threshold value-based determination method of calculation value of the item 4). When the diagnosis server calculates, the decision result and the result of need for replacing the hardware (H/W) replacement or the control compensation is sent to the diagnosis equipment through communication.

7) detailed decision result and whether the problem may be solved by H/W replacement or control compensation is displayed through the diagnosis equipment.

8) at the time of determining the control compensation, the problematic shift learning values of the transmission stored in a non-volatile memory within transmission control unit (TCU) are all initialized.

9) after the process 8) a target of the current control compensation is determined, and compensation amount of solenoid current control is determined by utilizing time for each control region of 4).

10) flashing (re-programming) is performed on the non-volatile memory in the transmission control unit with respect to contents corresponding to the 8) and 9) (TCU Flashing). This provides an effect of distributing control data for the transmission control unit optimized for the transmission hardware (H/W) of each vehicle.

In the above process 1) to 10) of failure diagnosis and compensation of a transmission by utilizing the diagnosis equipment DE, the apparatus 100 for diagnosing a transmission based on artificial intelligence may be provided as a server, and may generate and update the feature sets for each vehicle type and powertrain required for using the artificial intelligence model AIM of the diagnosis equipment DE. To this end, when generation of the feature set is required, the apparatus 100 for diagnosing a transmission based on artificial intelligence may extract and evaluate similar candidate feature set list from the database DB, to check whether sharing is possible. In addition, the apparatus 100 for diagnosing a transmission based on artificial intelligence may check and modify misdiagnosis with respect to the customer complaint data collected from repair shops, and reflect it to the artificial intelligence model. That is, the feature set reflecting the customer complaint data may be newly generated and the database DB may be updated.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A method comprising:
collecting vehicle information comprising transmission shift data of a vehicle;
pre-processing and labeling the transmission shift data;
among feature sets stored in a database, determining, as a plurality of candidate feature sets, a plurality of feature sets with respect to a plurality of other vehicles each associated with vehicle information that is same as at least a portion of the vehicle information of the vehicle;
generating a candidate feature set list comprising the plurality of candidate feature sets;
generating, using a supervised learning-based artificial intelligence model and for each of the plurality of candidate feature sets, an evaluation index of a transmission shift comfort level associated with the transmission shift data; and outputting a feature set of the vehicle for diagnosing a transmission equipped in the vehicle by selecting, among candidate feature sets having evaluation indexes above a threshold value, a candidate feature set having a highest evaluation index.

2. The method of claim 1, further comprising:

based on none of a second plurality of candidate feature sets having an evaluation index above the threshold value, generating a new feature set based on additional transmission shift data associated with the vehicle.

3. The method of claim 2, wherein the determining of the feature set of the vehicle comprises:

securing data about the vehicle;

pre-processing and labeling the secured data;

training, based on the pre-processed and labeled data, the supervised learning-based artificial intelligence model; and storing, in the database, a feature set generated by the training, wherein the training of the supervised learning-based artificial intelligence model uses a semi-supervised learning methodology.

4. The method of claim 3, wherein the semi-supervised learning methodology comprises a MixMatch algorithm.

5. The method of claim 1, wherein the portion of the vehicle information of the vehicle comprises at least one of a transmission model, motor usage, an engine fuel, an engine displacement, or an engine type.

6. The method of claim 1, wherein the evaluation index is based on a confusion matrix-based performance evaluation index indicating, using an accuracy rating and a false positive (FP) rate, performance of the supervised learning-based artificial intelligence model.

7. The method of claim 6, wherein the determining of the feature set of the vehicle comprises:

selecting, among the candidate feature sets having accuracy ratings above a second threshold value and FP rates below a third threshold value, the candidate feature set based on the candidate feature set having a highest accuracy rating.

8. The method of claim 7, further comprising determining the accuracy rating of the confusion matrix-based performance evaluation index based on a formula, (TP+TN)/(TP+TN+FN+FP), and calculating an FP rate of the confusion matrix-based performance evaluation index based on a formula, FP/(TP+TN+FN+FP), wherein TP represents true positive indicating that a positive prediction is correct, TN represents true negative indicating that a negative prediction is correct, FP represents false positive indicating that a positive prediction is wrong, and FN represents false negative indicating that a negative prediction is wrong, with respect to a transmission shift comfort level associated with the supervised learning-based artificial intelligence model.

9. The method of claim 1, further comprising:

causing a transmission diagnostic device to perform a diagnosis of the transmission of the vehicle using the output feature set of the vehicle.

10. A method for diagnosing a transmission based on artificial intelligence, the method comprising:

measuring first transmission shift data of a vehicle;

pre-processing the measured first transmission shift data;

determining, using a supervised learning-based artificial intelligence model and based on a first feature set associated with the vehicle, a transmission shift comfort level;

receiving information on dissatisfaction of a customer regarding the transmission shift comfort level;

receiving, based on a determination that the information on the dissatisfaction indicates that the customer has a complaint associated with the determined transmission shift comfort level, customer complaint data comprising the pre-processed first transmission shift data and the determined transmission shift comfort level;

labeling misdiagnosed data confirmed by a user, based on an accumulated count of the received customer complaint data being above a first threshold value;

generating second transmission shift data by adding the misdiagnosed data to the first feature set;

training, based on the second transmission shift data, the supervised learning-based artificial intelligence model and generating a second feature set associated with the vehicle; and storing the second feature set based on an evaluation index of the trained supervised learning-based artificial intelligence model being above a second threshold value.

11. The method of claim 10, wherein the generating of the second transmission shift data comprises:

determining a label ratio of the second transmission shift data;

training the supervised learning-based artificial intelligence model based on the label ratio satisfying a third threshold value; and terminating the training of the supervised learning-based artificial intelligence model based on the label ratio not satisfying the third threshold value.

12. The method of claim 10, wherein the evaluation index is based on a confusion matrix-based performance evaluation index indicating, using an accuracy rating and a false positive (FP) rate, performance of the supervised learning-based artificial intelligence model.

13. The method of claim 12, wherein the storing of the second feature set comprises:

setting the second feature set of the trained supervised learning-based artificial intelligence model as a representative feature set of the vehicle based on the accuracy rating being above a fourth threshold value and the FP rate being below a fifth threshold value.

14. An apparatus for diagnosing a transmission based on artificial intelligence, the apparatus comprising:

one or more processors; and memory storing instructions that, when executed by the one or more processors, cause the apparatus to:

collect and pre-process vehicle information and transmission shift data associated with a vehicle;

label the transmission shift data;

among feature sets stored in a database, determine, as a plurality of candidate feature sets, a plurality of feature sets with respect to a plurality of other vehicles each associated with vehicle information that is same as at least a portion of the vehicle information of the vehicle;

generate a candidate feature set list comprising the plurality of candidate feature sets;

generate, using a supervised learning-based artificial intelligence model and for each of the plurality of candidate feature sets, an evaluation index of a transmission shift comfort level associated with the transmission shift data; and output a feature set of the vehicle for diagnosing a transmission equipped in the vehicle by selecting, among candidate feature sets having evaluation indexes above a threshold value, a candidate feature set having a highest evaluation index.

15. The apparatus of claim 14, wherein the instructions, when executed by the one or more processors, further cause the apparatus to, based on none of a second plurality of candidate feature sets having an evaluation index above the threshold value, generate a new feature set based on additional transmission shift data associated with the vehicle.

16. The apparatus of claim 15, wherein the instructions, when executed by the one or more processors, cause the apparatus to generate the new feature set by using a semi-supervised learning methodology comprising a MixMatch algorithm.

17. The apparatus of claim 14, wherein the evaluation index is based on a confusion matrix-based performance evaluation index indicating, using an accuracy rating and a false positive (FP) rate, performance of the supervised learning-based artificial intelligence model; and wherein the instructions, when executed by the one or more processors, cause the apparatus to determine the feature set of the vehicle by selecting, among the candidate feature sets having accuracy ratings above a second threshold value and FP rates below a third threshold value, the candidate feature set based on the candidate feature set having a highest accuracy rating.

18. The apparatus of claim 14, wherein the instructions, when executed by the one or more processors, further cause the apparatus to, based on customer complaint data associated with the transmission shift comfort level satisfying a first threshold value:

generate second transmission shift data by:

labeling misdiagnosed data confirmed by a user; and adding the misdiagnosed data to existing data to generate an updated feature set; and based on an evaluation index associated with the updated feature set satisfying a second threshold value, determine the updated feature set as a final feature set of the vehicle and storing the updated feature set in the database.

19. The apparatus of claim 18, wherein the instructions, when executed by the one or more processors, further cause the apparatus to:

use a confusion matrix-based performance evaluation index configured to evaluate performance of the supervised learning-based artificial intelligence model according to an accuracy rating and a false positive (FP) rate; and determine the updated feature set as the final feature set of the vehicle, based on the accuracy rating of the confusion matrix-based performance evaluation index being above a third threshold value and the FP rate of the confusion matrix-based performance evaluation index being below a fourth threshold value.

20. The apparatus of claim 14, wherein the instructions, when executed by the one or more processors, further cause the apparatus to cause a transmission diagnostic device to perform a diagnosis of the transmission of the vehicle using the output feature set of the vehicle.

* * * * *